(12) United States Patent
Wall et al.

(10) Patent No.: US 10,108,013 B2
(45) Date of Patent: Oct. 23, 2018

(54) INDIRECT-VIEW AUGMENTED REALITY DISPLAY SYSTEM

(71) Applicant: Microsoft Technology Licensing, LLC, Redmond, WA (US)

(72) Inventors: Richard Andrew Wall, Kirkland, WA (US); Bernard Charles Kress, Redwood City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 96 days.

(21) Appl. No.: 15/243,434

(22) Filed: Aug. 22, 2016

(65) Prior Publication Data

US 2018/0052326 A1    Feb. 22, 2018

(51) Int. Cl.
*G02B 27/01* (2006.01)
*G06T 19/00* (2011.01)
(Continued)

(52) U.S. Cl.
CPC ........ *G02B 27/0172* (2013.01); *G06T 19/006* (2013.01); *H04N 13/044* (2013.01);
(Continued)

(58) Field of Classification Search
CPC ........ G02B 27/0172; G02B 2027/0123; G02B 2027/014; G06T 19/00
See application file for complete search history.

(56) References Cited

U.S. PATENT DOCUMENTS 6,222,675 B1    4/2001  Mall et al.
6,972,734 B1   12/2005  Ohshima et al.
(Continued)

FOREIGN PATENT DOCUMENTS

GB          2376397 A      12/2002
WO      2015184409 A1      12/2015

OTHER PUBLICATIONS

Kiyokawa, et al., "An Optical See-through Display for Mutual Occlusion of Real and Virtual Environments", In Proceedings of IEEE and ACM International Symposium on Augmented Reality, Oct. 5, 2000, (8 pages total).
(Continued)

*Primary Examiner* — Sahlu Okebato
(74) *Attorney, Agent, or Firm* — Mark K. Young; Mayer & Williams PC

(57) ABSTRACT

An augmented reality display system utilized in computing platforms such as wearable head-mounted display (HMD) devices includes a virtual reality display that is located in front of a user's eyes to provide a direct view of virtual world images. An optical periscope, comprising reflective or diffractive optical systems, is configured to provide an indirect view of the real world. By locating the virtual reality display (and its associated optical and electrical components) close to the user's eyes and within the user's direct line of sight, the field of view (FOV) of the virtual world is increased as compared with conventional indirect-view virtual reality displays. The optical periscope provides an FOV of the real world that would otherwise be obstructed by the positioning of the direct-view virtual reality display in front of the user's eyes.

20 Claims, 14 Drawing Sheets

(51) Int. Cl.
*H04N 13/04* (2006.01)
*G02B 23/08* (2006.01)

(52) U.S. Cl.
CPC ........ *G02B 23/08* (2013.01); *G02B 2027/014* (2013.01); *G02B 2027/0123* (2013.01); *G02B 2027/0174* (2013.01)

(56) References Cited

U.S. PATENT DOCUMENTS

| | | |
|---|---|---|
| 2003/0129567 A1 | 7/2003 | Cabato et al. |
| 2011/0026090 A1 | 2/2011 | Minor et al. |
| 2013/0222215 A1 | 8/2013 | Kobayashi |
| 2013/0242392 A1 | 9/2013 | Amirparviz et al. |
| 2013/0242405 A1 | 9/2013 | Gupta |
| 2014/0152531 A1 | 6/2014 | Murray et al. |
| 2014/0177023 A1 | 6/2014 | Gao et al. |
| 2014/0313585 A1 | 10/2014 | Jarvenpaa |
| 2014/0375789 A1* | 12/2014 | Lou .................. G02B 27/0172 348/78 |
| 2015/0346490 A1* | 12/2015 | Tekolste ............. G02B 27/0081 349/11 |
| 2015/0363978 A1* | 12/2015 | Maimone ........... G02B 27/0172 345/633 |
| 2016/0026253 A1* | 1/2016 | Bradski ................ G02B 27/225 345/8 |

OTHER PUBLICATIONS

"Head Mounted Display for Virtual/Augmented Reality", Published on: Nov. 6, 2014, Available at: https://www.youtube.com/watch?v=o7Prr68jH20 (2 pages total).

Kiyokawa, Kiyoshi, "A Wide Field-of-view Head Mounted Projective Display using Hyperbolic Half-silvered Mirrors", In Proceedings of 6th IEEE and ACM International Symposium on Mixed and Augmented Reality, Nov. 13, 2007, (4 pages total).

Mirza, et al., "Key Challenges to Affordable See Through Wearable Displays: The Missing Link for Mobile AR Mass Deployment", In Proceedings of the SPIE, vol. 8720, May 31, 2013, pp. 1-6 (6 pages total).

"International Search Report and Written Opinion Issued in PCT Application No. PCT/US2017/046671", dated Nov. 17, 2017, 12 Pages.

* cited by examiner

INDIRECT-VIEW AUGMENTED REALITY DISPLAY SYSTEM

BACKGROUND

Some current augmented reality display systems used in head-mounted display devices utilize indirect-view optics that overlay virtual world images onto the real world that is directly viewed by an HMD device user.

SUMMARY

An augmented reality display system utilized in computing platforms such as wearable head-mounted display (HMD) devices includes a virtual reality display that is located in front of a user's eyes to provide a direct view of virtual world images. An optical periscope, comprising reflective or diffractive optical systems, is configured to provide an indirect view of the real world. By locating the virtual reality display (and its associated optical, mechanical, and electrical components) close to the user's eyes and within the user's direct line of sight, the field of view (FOV) of the virtual world is extended as compared with conventional indirect-view virtual reality displays. The optical periscope provides an FOV of the real world that would otherwise be occluded by the positioning of the direct-view virtual reality display in front of the user's eyes.

In one illustrative example, the optical periscope operates in reflection and comprises an objective mirror and a combiner plate such as a partially silvered mirror that is located between the user's eyes and the virtual reality display. Real world images are reflected by the periscope mirrors to the user's eyes, while virtual world images from a direct-view eyepiece (comprising the virtual reality display and collimating optics) are passed through the combiner plate to the user's eyes. In another illustrative example, the diffractive optical periscope comprises a see-through waveguide and diffraction gratings such as diffractive optical elements that are located between the user's eyes and the virtual reality display. Real world images are in-coupled at an in-coupling grating, propagated through total internal reflection (TIR) in the waveguide, and out-coupled at an out-coupling grating to the user's eyes. Virtual world images from the direct-view eyepiece are passed through the see-through waveguide and out-coupling grating to the user' eyes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
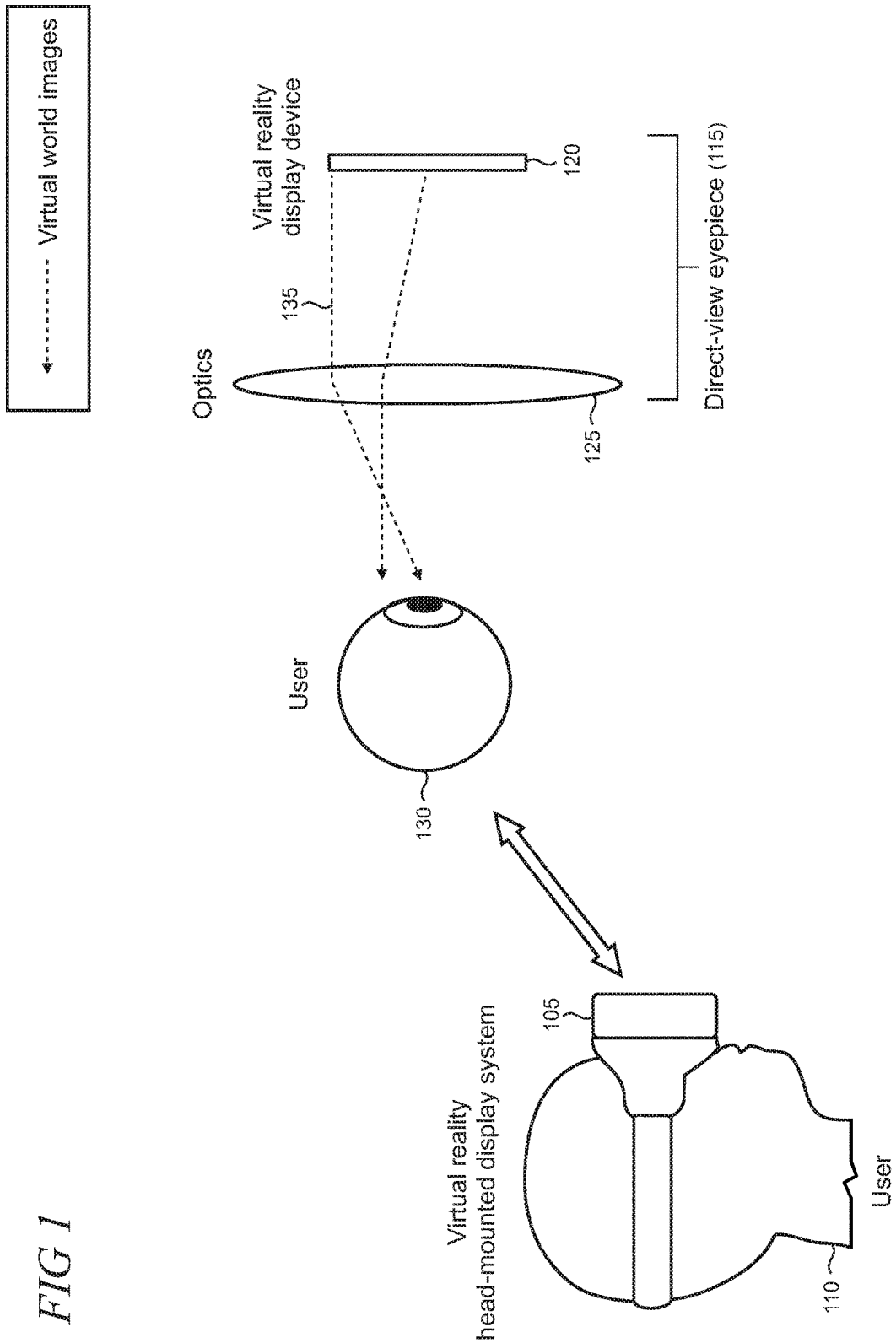
FIG. 1 shows an illustrative virtual reality head-mounted display (HMD) device that incorporates a direct-view eyepiece.

FIG. 1 shows an illustrative virtual reality head-mounted display (HMD) device 105 worn by a user 110 that incorporates a direct-view eyepiece 115. The direct-view eyepiece 115 includes, in this example, a virtual reality display device 120 and optics 125 such as one or more collimating and/or magnifying lenses. The virtual reality display device 120 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The direct-view eyepiece 115 is typically utilized in conjunction with other components supported in the device 105 including electronic and structural components (not shown in FIG. 1). The direct-view eyepiece 115 is mounted in the HMD device 105 to be directly in front of the user's eye 130, i.e., within the user's direct line of sight (it is noted that while a single eye 130 is shown for the sake of clarity in exposition, the present indirect-view augmented reality display system may be utilized in both monocular and binocular applications).

Figure 2:
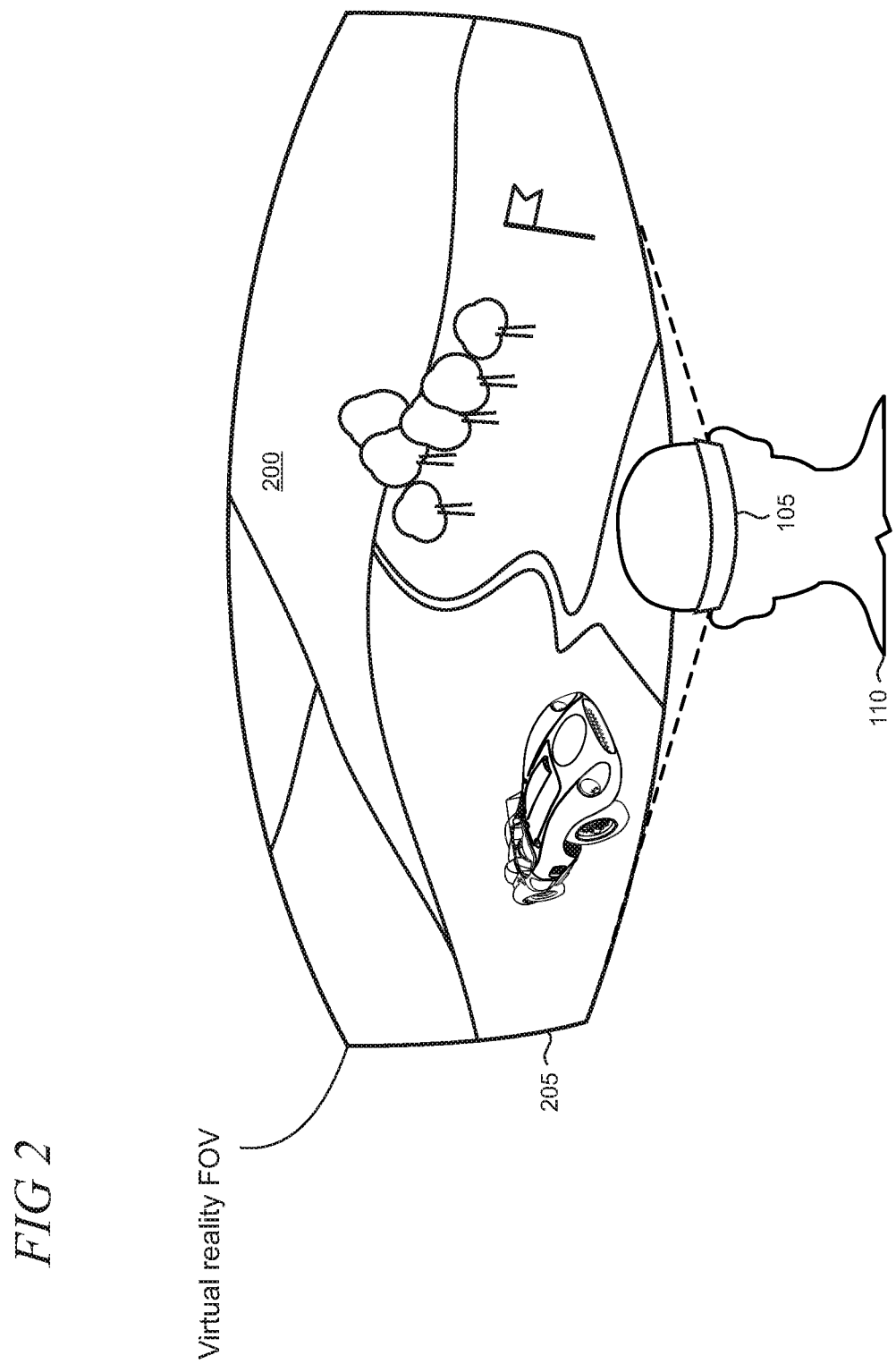
FIG. 2 shows an illustrative field of view (FOV) of a virtual reality environment.

The direct-view eyepiece 115 is configured to provide virtual world images (representatively indicated by ray 135) rendered by the virtual reality display device 120 to the user's eye 130. For example, as shown in FIG. 2, the virtual world images can be part of a virtual reality environment 200 that is rendered within a field of view (FOV) 205 of the virtual reality HMD device 105. It is noted that the FOV 205 shown in this example has an arbitrary shape and that various shapes and FOV configurations may be utilized depending on the needs of a particular implementation of the present indirect-view augmented reality display system.

Figure 3:
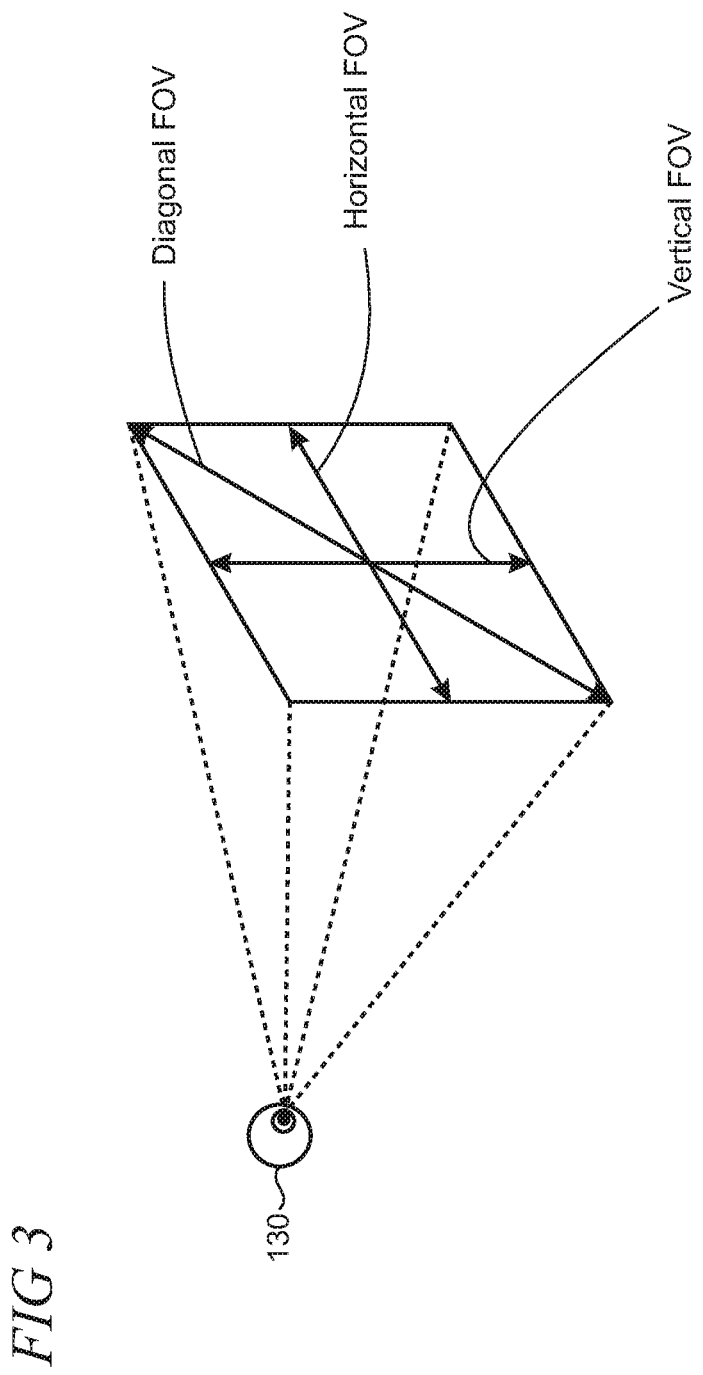
FIG. 3 shows an illustrative FOV described by horizontal, vertical, and/or diagonal angles.

As shown in FIG. 3, the FOV presented to the user's eye may be described in terms of horizontal, vertical, and/or diagonal angles. As the direct-view eyepiece 115 (FIG. 1) is positioned in front of, and close to, the user's eye, it can be configured to provide a relatively large FOV, for example 100 degrees diagonally or greater in some applications. However, the front-mounted location of the direct-view eyepiece and the associated electronic and structural components can create an obstruction to the user's view of the external real world environment. Indeed, in some virtual reality HMD devices using front mounted direct-view displays the real world view is completely occluded which can limit the user's awareness of the surrounding real world environment.

Figure 4:
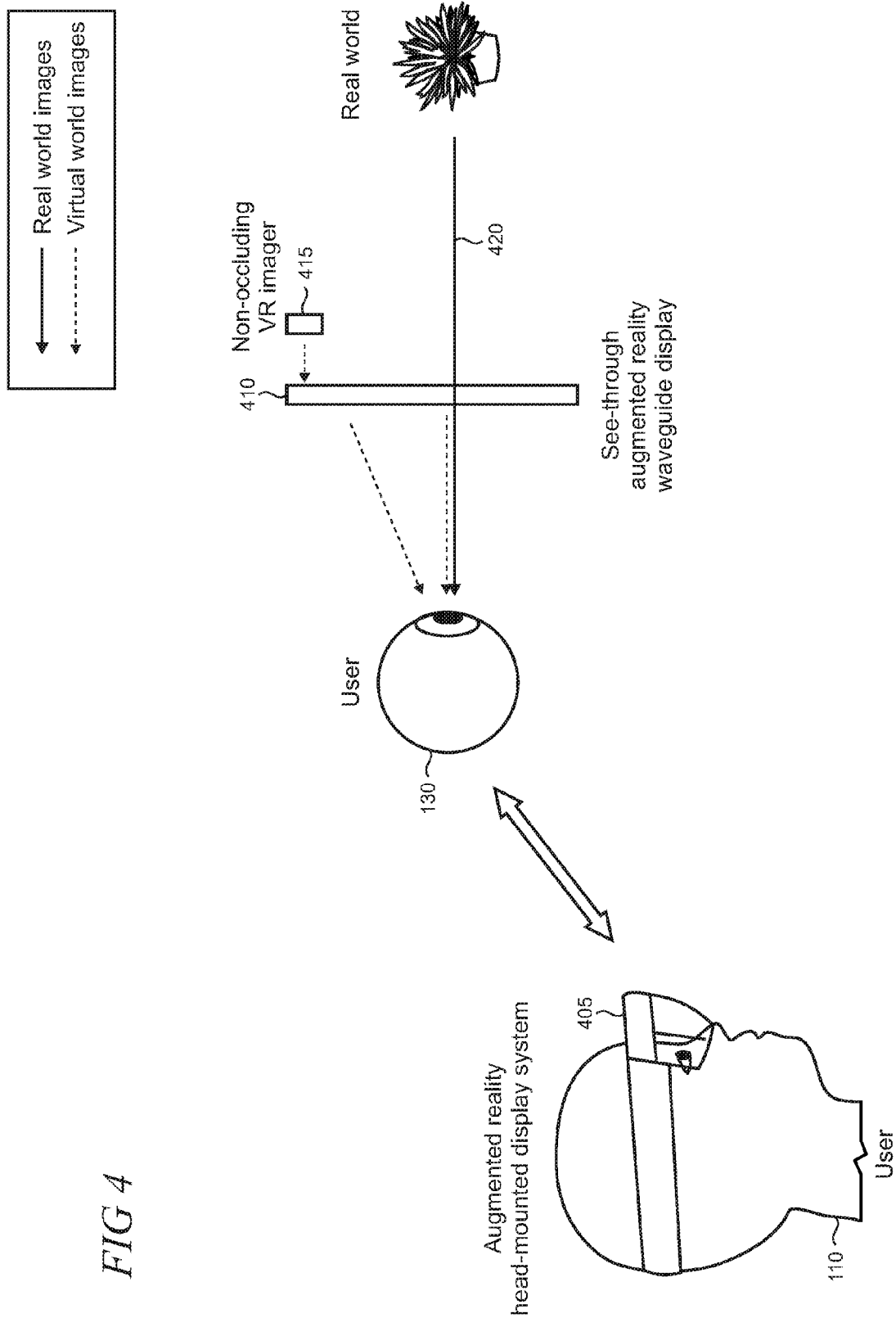
FIG. 4 shows an illustrative augmented reality HMD device that incorporates a see-through waveguide and non-occluding virtual reality imager.

FIG. 4 shows an illustrative augmented reality HMD device 405 that incorporates a see-through waveguide display 410 and a non-occluding virtual reality imager 415. The virtual reality imager 415 is considered non-occluding as it is not positioned within the view of the user 110 to block the view of the real world. The imager 415 generates virtual world images that are guided by the waveguide to the user's eye 130. The waveguide display 410 is configured in this illustrative example as a near-eye display. In a near-eye display, the imager does not actually shine the images on a surface such as a glass lens to create the visual display for the user. This is not feasible because the human eye cannot focus on something that is that close. Rather than create a visible image on a surface, a near-eye display uses pupil forming optics to form a pupil and the eye 130 acts as the last element in the optical chain and converts the light from the pupil into an image on the eye's retina as a virtual display.

Accordingly, because the imager 415 is relatively small due to packaging and other constraints in the HMD device 405, the waveguide display 410 may include exit-pupil expanding components to horizontally and vertically expand the exit pupil of the virtual images that are output to the user's eye. The expanded exit pupil typically facilitates a virtual world display to be sufficiently sized to meet the various design requirements such as image resolution, FOV, and the like of a given optical system while enabling the imager and associated components to be relatively light and compact. Being see-through, the waveguide display 410 enables the user to perceive light with all FOV angles from the real world without obstruction, as representatively indicated by ray 420.

Figure 5:
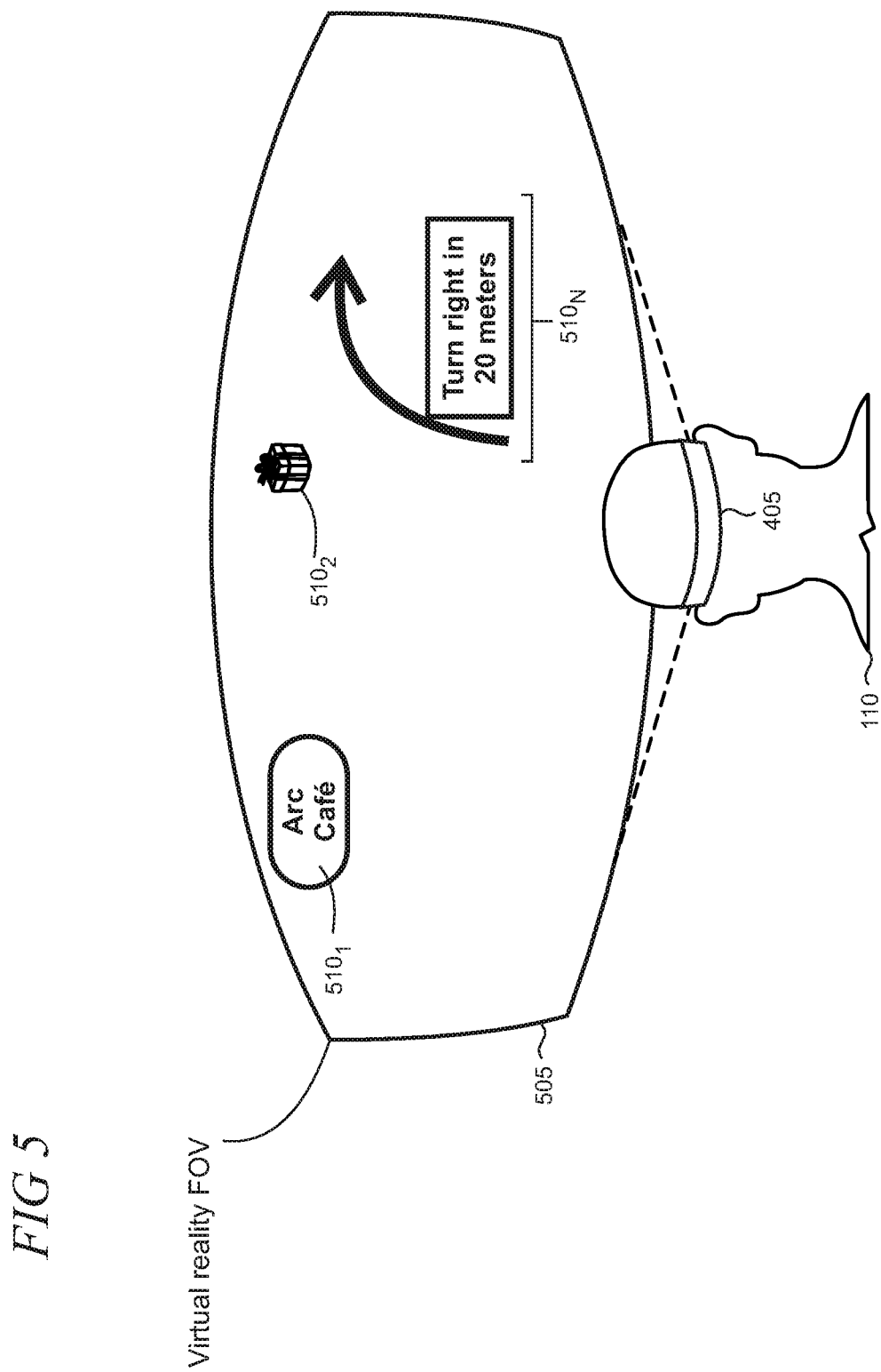
FIG. 5 shows illustrative virtual world objects rendered within a FOV of an augmented reality HMD device.
Figure 6:
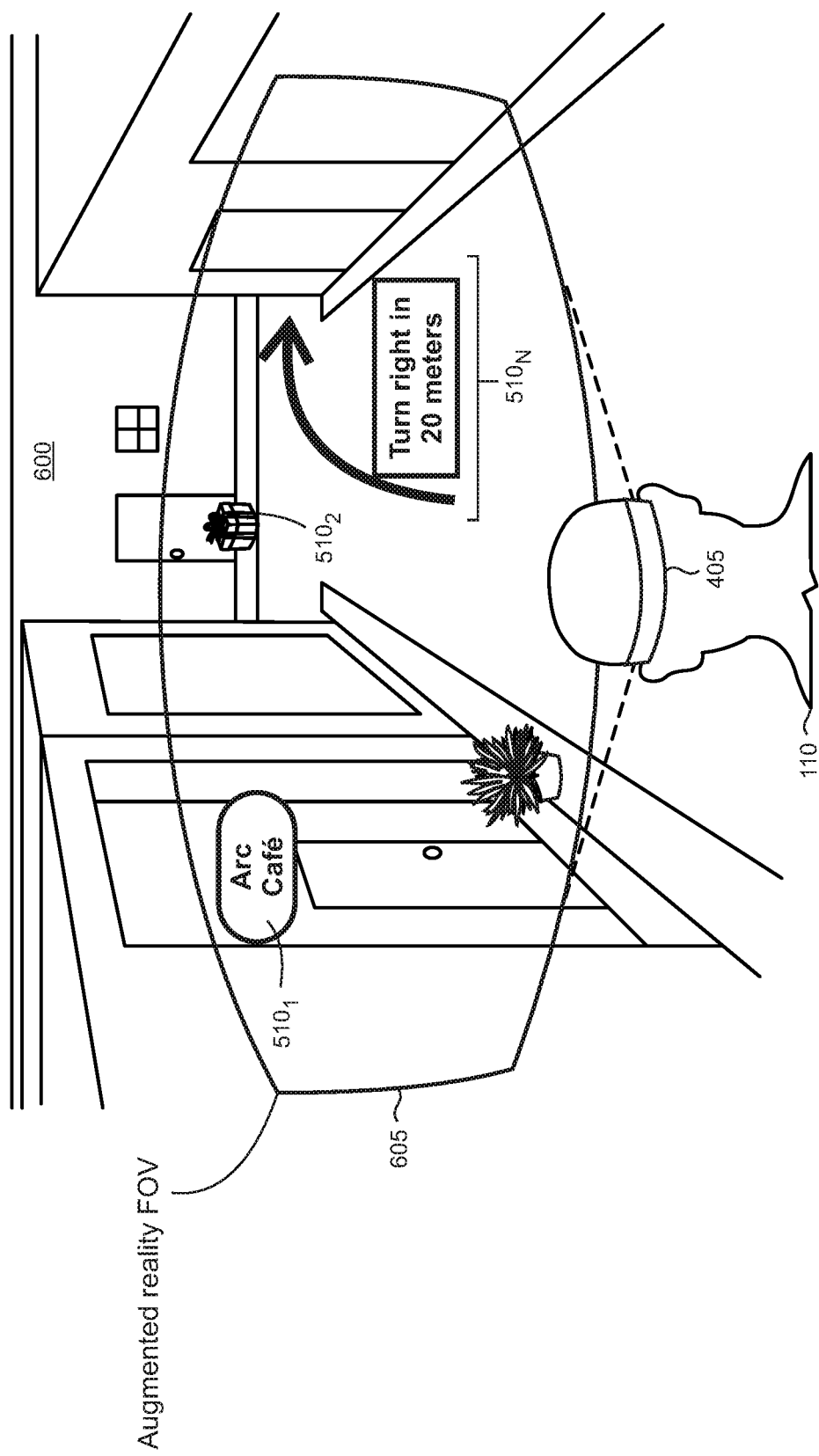
FIG. 6 illustratively shows how virtual world objects are overlaid onto real world images within the FOV of the augmented reality HMD device.

The waveguide display 410 can show various virtual objects $510_{1...N}$, within a virtual reality FOV 505 as shown in FIG. 5, and/or an entire virtual world in some applications. As shown in FIG. 6, when the virtual objects 510 are superimposed over the real world 600 viewed through the see-through waveguide display 410, an augmented reality environment is created within the FOV 605.

While the see-through waveguide display 410 can provide satisfactory features and performance, the small imager has some inherent limitations for FOV. In addition, light can only propagate through TIR in the waveguide display within a narrower range of angles of incidence in the polymeric materials typically used in HMD devices targeted to consumer applications as compared with more expensive optical-grade glass which has a higher index of refraction. For example, the FOV of the waveguide display 410 may be in the range of 30-35 degrees, or about a third of that provided by the direct-view eyepiece 115 shown in FIG. 1 and described in the accompanying text.

Some of the disadvantages of the virtual reality HMD device 105 and augmented reality HMD 405, for example the real world occlusion in the device 105 and the smaller FOV for virtual reality images in device 405, can be addressed by the present indirect-view augmented reality display system. The system employs an optical periscope that provides an indirect-view of the real world and is described in the context of two illustrative embodiments— an optical periscope that operates in reflection, and an optical periscope that operates by diffraction. The optical periscope is utilized in combination with a direct-view eyepiece for virtual world imaging which employs a relatively large front-mounted display and/or optics that are located in front of the user's eye.

Figure 7:
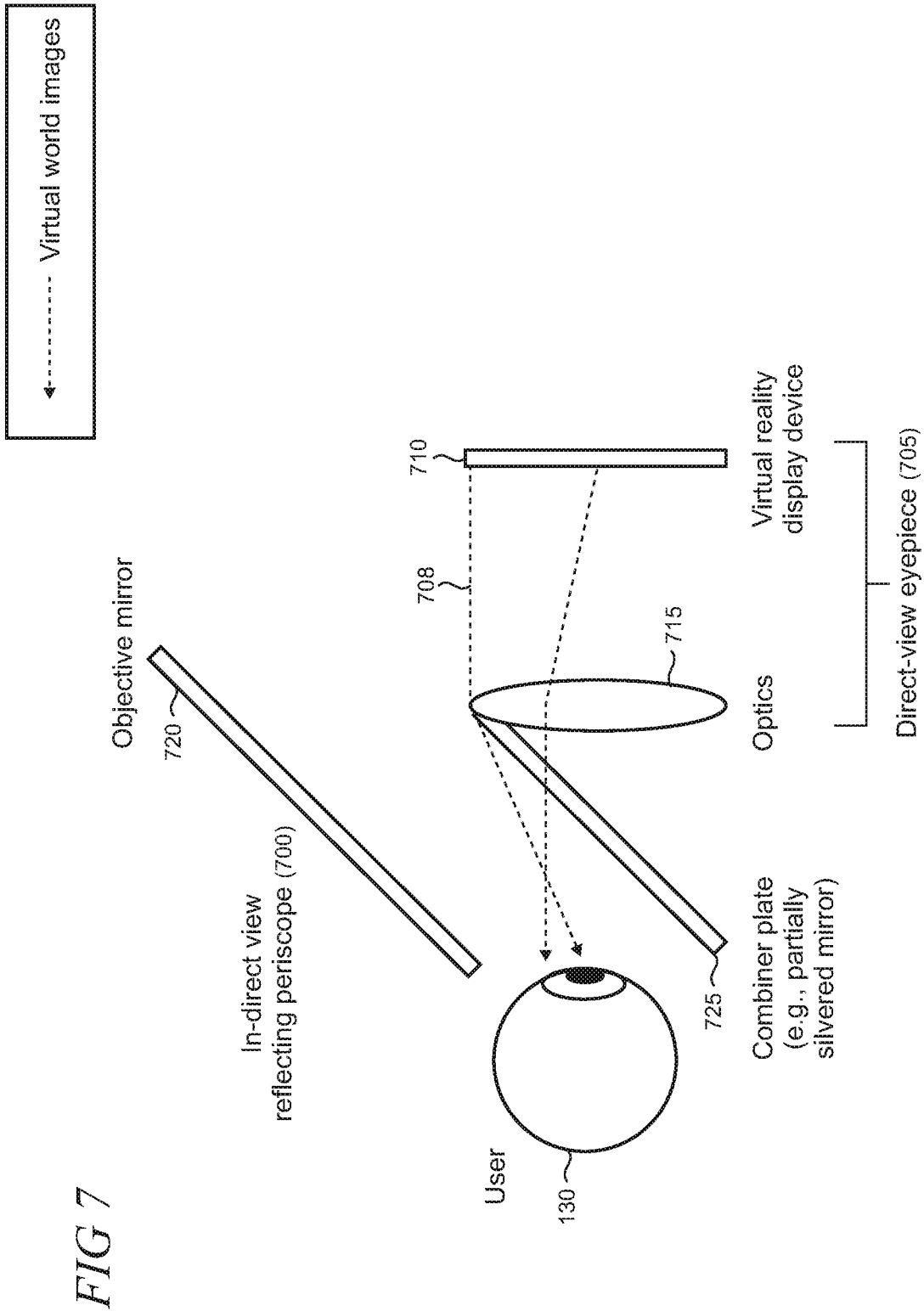
FIGS. 7, 8, and 9 show an illustrative reflecting periscope configured to provide real world images to a user.
Figure 8:
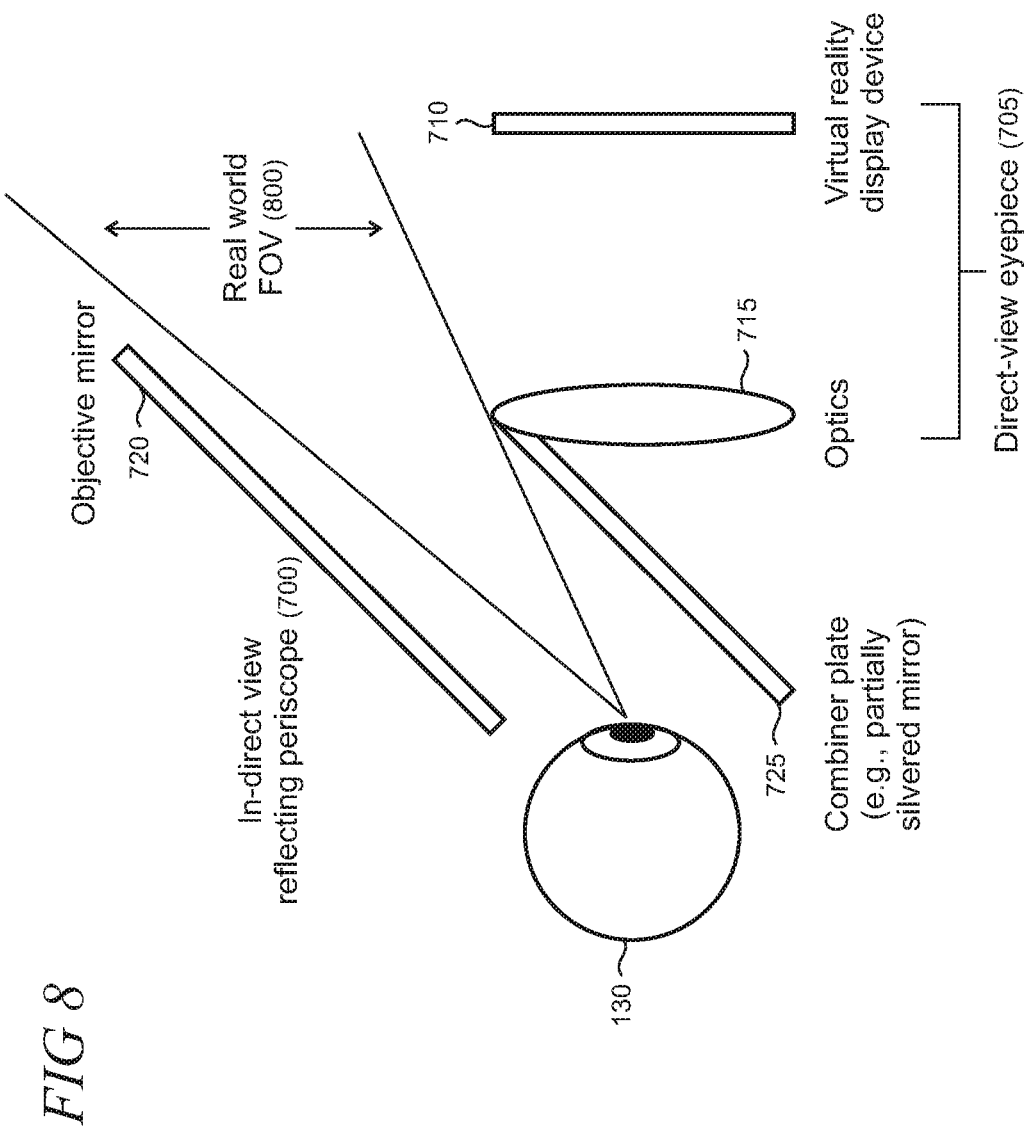
Figure 9:
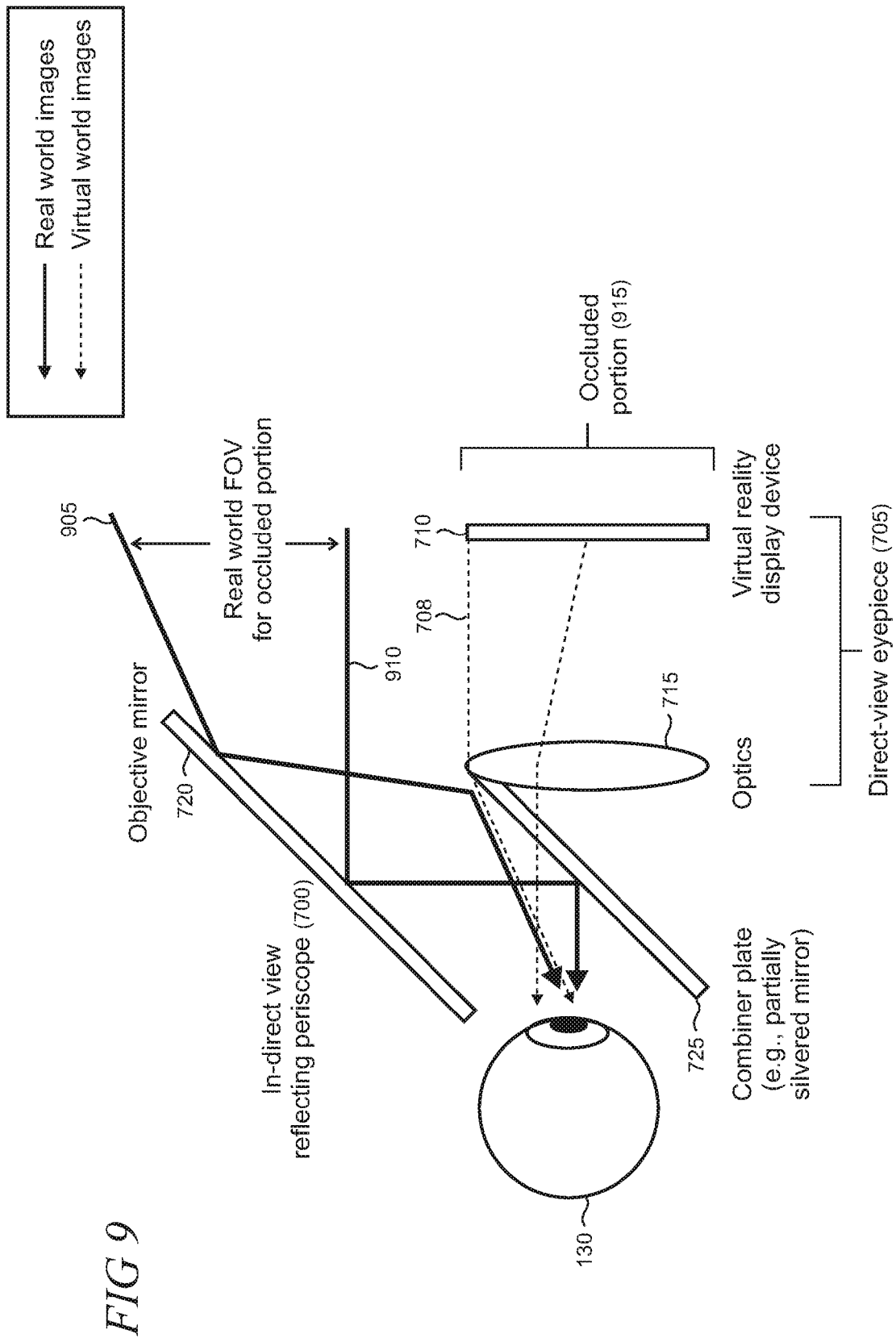

FIGS. 7, 8, and 9 show an illustrative reflecting periscope 700 configured to provide real world images with an indirect view to the user's eye 130. The reflecting periscope 700 is used in combination with a direct-view eyepiece 705 that is front-mounted in a device such as an HMD and which renders virtual world images to the user, as representatively indicated by ray 708. The direct-view eyepiece 705 includes a virtual reality display device 710 and optics 715 that may be arranged in a similar manner as those elements shown in FIG. 1 and described in the accompanying text. The reflecting periscope 700 comprises an objective mirror 720 and a combiner plate 725 such as a partially silvered mirror. The objective mirror 720 and combiner plate 725 are disposed in a parallel alignment in the device in which the spacing of the component defines an optical objective for the periscope. The combiner plate 715 is located in between the user's eye 130 and direct-view eyepiece 705, as shown, and allows the virtual world images from the direct-view eyepiece to be passed to the user's eye.

As shown in FIG. 8, the reflecting periscope 700 presents an FOV 800 of the real world to the user's eye. The mirrors in the periscope can be positioned and aligned in the device to pass all angles of the FOV of the real world to the user in typical applications. As shown by the rays 905 and 910 in FIG. 9, the real world FOV of the periscope can also include the FOV angles of a portion 915 of the view in front of the user that is otherwise occluded by the direct-view eyepiece 705.

Figure 10:
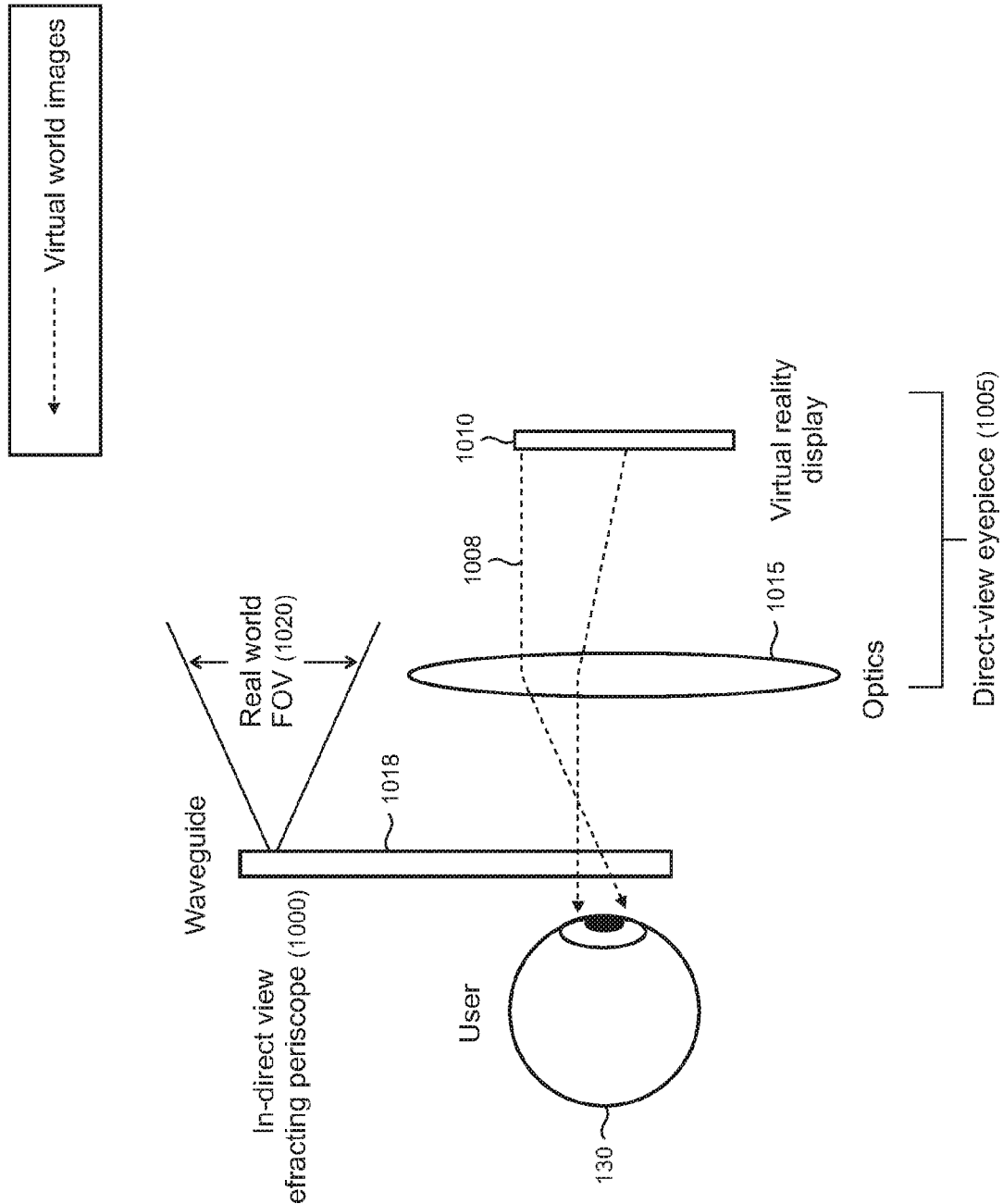
FIGS. 10 and 11 show an illustrative diffractive periscope configured to provide real world images to a user.
Figure 11:
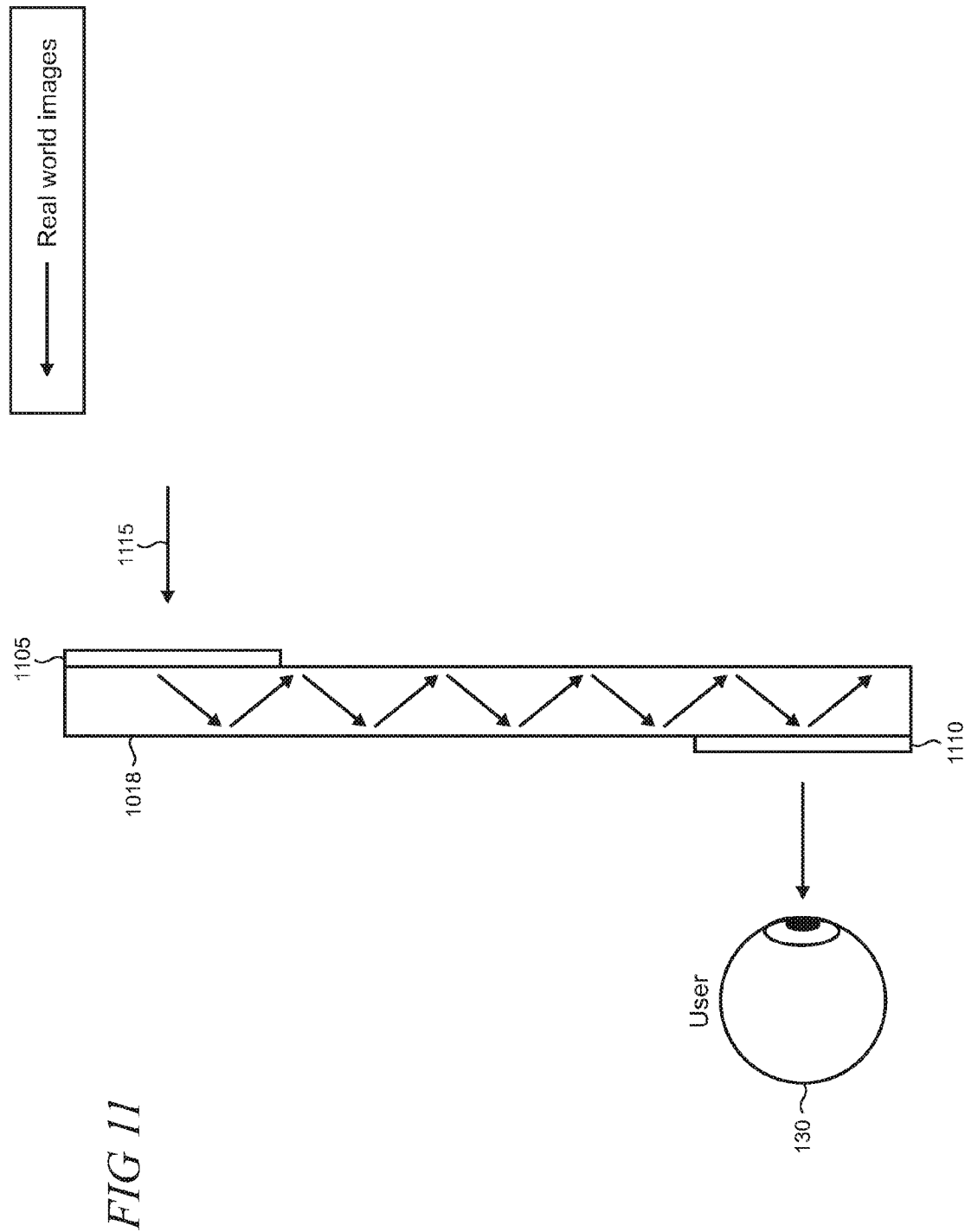

FIGS. 10 and 11 show an illustrative diffractive periscope 1000 configured to provide real world images with an indirect-view to the user's eye 130. The diffractive periscope 1000 is used in combination with a direct-view eyepiece 1005 that is front-mounted in a device such as an HMD and which renders virtual world images to the user, as representatively indicated by ray 1008. The direct-view eyepiece 1005 includes a virtual reality display device 1010 and optics 1015 that may be arranged in a similar manner as those elements shown in FIG. 1 and described in the accompanying text.

The diffractive periscope 1000 comprises a waveguide 1018 that passes an FOV 1020 of the real world to the user's eye 130. As shown in FIG. 11, the waveguide 1018 in the periscope can include diffraction gratings 1105 and 1110 that are respectively configured for in-coupling and out-coupling. The diffraction gratings can be discrete elements such as diffractive optical elements and/or be directly integrated into the waveguide substrate in some cases. Light forming real world images, as represented by ray 1115, is in-coupled to the waveguide 1018 by the in-coupling grating 1105 (which functions as the objective to the periscope) and propagates in TIR in the downward direction, as shown, to the out-coupling grating 1110.

The out-coupling grating 1110 out-couples the real world light to the user's eye as an exit pupil. The diffraction gratings 1105 and 1110 can be sized and positioned on the waveguide 1018 in such a manner in some applications to pass all angles of the FOV of the real world to the user. In other applications, the real world FOV 1020 can be more limited, but typically still be large enough to enable the user to readily perceive the real world environment. The waveguide and out-coupling grating are configured to be see-through so that virtual world images from the direct-view eyepiece are passed to the user's eye. The waveguide and diffraction gratings may include, or be incorporated into systems having pupil expanding optics in some cases. For example, diffractive optical elements can be configured for exit pupil expansion in multiple directions and/or one or more diffractive-fold components providing exit pupil expansion may be utilized.

In some implementations, the spatial offset of the objective of the optical periscope from the user's normal line of sight may cause some discomfort or disorientation for the user. This can be minimized in typical implementations by packaging the indirect-view periscope and the direct-view eyepiece in a manner than minimizes the offset. While the periscope objective is shown being positioned above the direct-view eyepiece in both the reflective and diffractive embodiments, in alternative implementations, the periscope objective can be located to either side of the direct-view eyepiece, or underneath it. In other embodiments, the optical periscopes can be selectively turned on and off, for example using a mechanical and/or optical shutter to enable the HMD device to be used as a pure virtual reality device. In some implementations, the periscope can be activated from an off state to an on state to enable awareness of the real world environment, for example, in cases when the HMD device detects a trip or other hazard.

Figure 12:
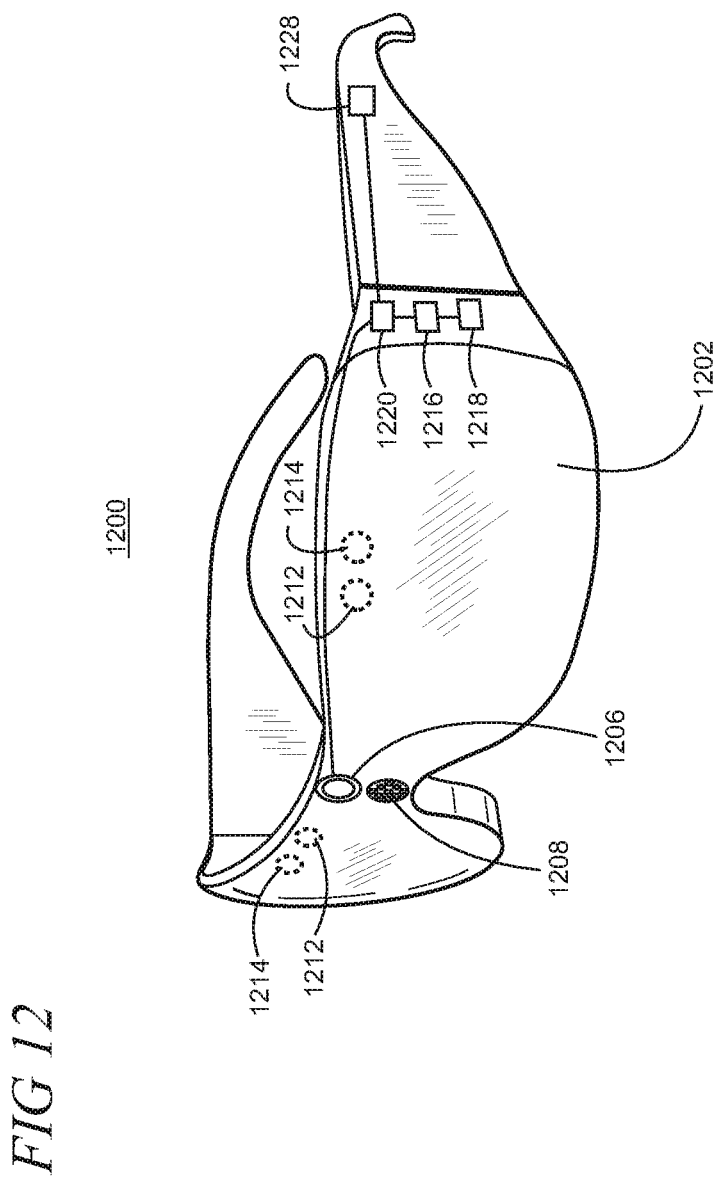
FIG. 12 is a pictorial view of an illustrative example of an augmented reality HMD device.
Figure 13:
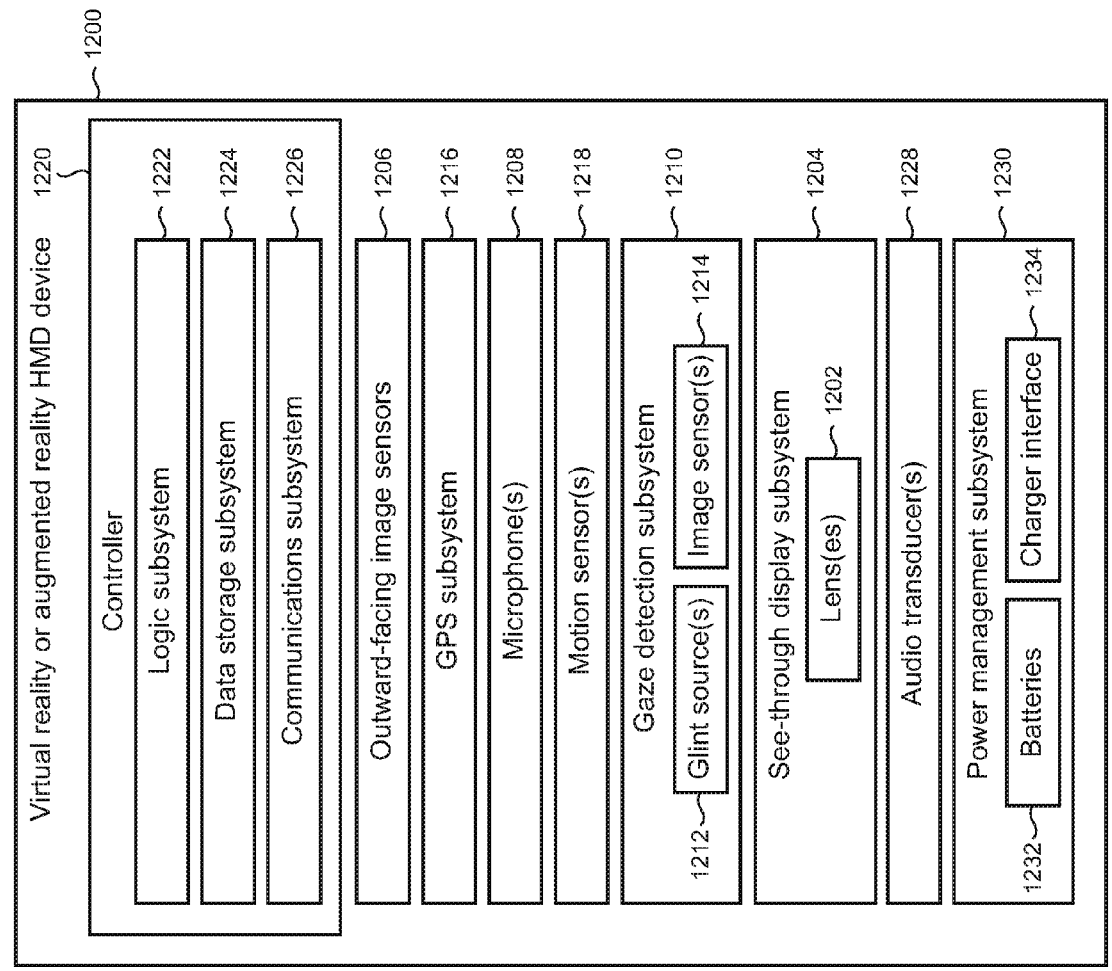
FIG. 13 shows a block diagram of an illustrative example of an augmented reality HMD device.

FIG. 12 shows one particular illustrative example of an augmented reality or virtual reality HMD device 1200 that may be adapted to include the indirect-view optical periscopes described above, and FIG. 13 shows a functional block diagram of the device 1200. HMD device 1200 comprises one or more lenses 1202 that form a part of a see-through display subsystem 1204, so that images may be displayed using lenses 1202 (e.g. using projection onto lenses 1202, one or more waveguide systems, such as a near-eye display system, incorporated into the lenses 1202, and/or in any other suitable manner). HMD device 1200 further comprises one or more outward-facing image sensors 1206 configured to acquire images of a background scene and/or physical environment being viewed by a user, and may include one or more microphones 1208 configured to detect sounds, such as voice commands from a user. Outward-facing image sensors 1206 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 1200 may further include a gaze detection subsystem 1210 configured for detecting a direction of gaze of each eye of a user or a direction or location of focus, as described above. Gaze detection subsystem 1210 may be configured to determine gaze directions of each of a user's eyes in any suitable manner. For example, in the illustrative example shown, a gaze detection subsystem 1210 includes one or more glint sources 1212, such as infrared light sources, that are configured to cause a glint of light to reflect from each eyeball of a user, and one or more image sensors 1214, such as inward-facing sensors, that are configured to capture an image of each eyeball of the user. Changes in the glints from the user's eyeballs and/or a location of a user's pupil, as determined from image data gathered using the image sensor(s) 1214, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1210 may have any suitable number and arrangement of light sources and image sensors. In some implementations, the gaze detection subsystem 1210 may be omitted.

The HMD device 1200 may also include additional sensors. For example, HMD device 1200 may comprise a global positioning system (GPS) subsystem 1216 to allow a location of the HMD device 1200 to be determined. This may help to identify real-world objects, such as buildings, etc. that may be located in the user's adjoining physical environment.

The HMD device 1200 may further include one or more motion sensors 1218 (e.g., inertial, multi-axis gyroscopic, or acceleration sensors) to detect movement and position/orientation/pose of a user's head when the user is wearing the system as part of a virtual reality or augmented reality HMD device. Motion data may be used, potentially along with eye-tracking glint data and outward-facing image data, for gaze detection, as well as for image stabilization to help correct for blur in images from the outward-facing image sensor(s) 1206. The use of motion data may allow changes in gaze location to be tracked even if image data from outward-facing image sensor(s) 1206 cannot be resolved.

In addition, motion sensors 1218, as well as microphone(s) 1208 and gaze detection subsystem 1210, also may be employed as user input devices, such that a user may interact with the HMD device 1200 via gestures of the eye, neck and/or head, as well as via verbal commands in some cases. It may be understood that sensors illustrated in FIGS. 12 and 13 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 1200 can further include a controller 1220 such as one or more processors having a logic subsystem 1222 and a data storage subsystem 1224 in communication with the sensors, gaze detection subsystem 1210, display subsystem 1204, and/or other components through a communications subsystem 1226. The communications subsystem 1226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1224 may include instructions stored thereon that are executable by logic subsystem 1222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 1200 is configured with one or more audio transducers 1228 (e.g., speakers, earphones, etc.) so that audio can be utilized as part of a virtual reality or augmented reality experience. A power management subsystem 1230 may include one or more batteries 1232 and/or protection circuit modules (PCMs) and an associated charger interface 1234 and/or remote power interface for supplying power to components in the HMD device 1200.

It may be appreciated that the HMD device 1200 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 14:
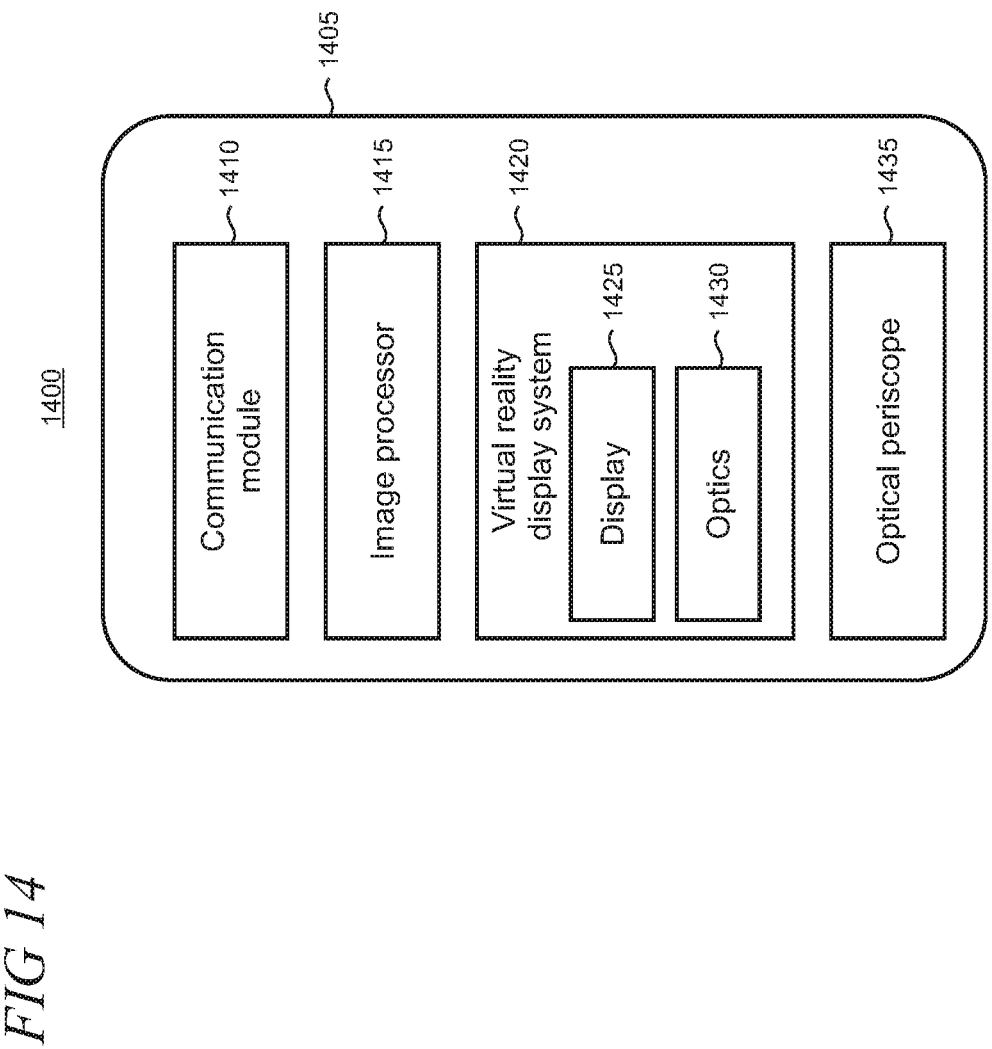
FIG. 14 shows a block diagram of an illustrative electronic device that incorporates an optical periscope configured to provide real world images to a user.

As shown in FIG. 14, the present indirect-view augmented reality display system can be used in a mobile or portable electronic device 1400, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1400 includes a housing 1405 to house a communication module 1410 for receiving and transmitting information from and to an external device, or a remote system or service (not shown). The portable device 1400 can be implemented in a tethered configuration in which it interoperates and/or shares computing hardware, data, or other resources with one or more coupled devices (e.g., a device 110 shown in FIG. 1 and described in the accompanying text) to which it is physically or logically tethered. The portable device 1400 can also be implemented in a non-tethered or standalone configuration.

The portable device 1400 may also include an image processor 1415 using one or more processors for handling the received and transmitted information, and a virtual display system 1420 to support viewing of virtual world images. The virtual display system 1420 can include a direct-view eyepiece including a display 1425 and optics 1430. The image processor 1415 may be operatively connected to the display system 1425 to provide image data, such as video data, to the display device 1425 to render an image thereon. An optical periscope 1435 operating in reflection or diffraction, as described above may also be included in the portable device 1400.

The present indirect-view augmented reality display system may also be utilized in non-portable devices in tethered or non-tethered configurations, such as gaming devices, multimedia consoles, personal computers, vending machines, smart appliances, Internet-connected devices, and home appliances, such as an oven, microwave oven and other appliances, and other non-portable devices.

Various exemplary embodiments of the present indirect-view augmented reality display system are now presented by way of illustration and not as an exhaustive list of all embodiments. An example includes an augmented reality display system configured to display real world images and virtual world images to a user of the system, comprising: a virtual reality display device configured to render the virtual world images to the user, the virtual reality display device further configured for direct view by the user by being located in front of the user's eye; and an optical periscope configured to provide real world images to the user in which the real world images provide a field of view of the real world in front of the user that is unobstructed by the virtual reality display, the optical periscope including a combiner plate disposed between the user's eye and the virtual reality display device and configured to pass virtual world images from the virtual reality display to the user's eye and reflect real world images having the unobstructed field of view to the user's eye.

In another example, the virtual reality display device is a non-see-through device. In another example, the combiner plate is a partially-silvered mirror. In another example, the field of view of the real world is selectively switchable from on to off so that only the virtual world images are rendered. In another example, the virtual reality display device includes one of light emitting diode, liquid crystal on silicon device, organic light emitting diode array, or micro-electro mechanical system device. In another example, the virtual reality display device comprises a micro-display operating in one of transmission, reflection, or emission. In another example, the virtual reality display device includes one or more collimating lenses. In another example, the virtual reality display device comprises a direct-view eyepiece. In another example, the augmented reality display system is incorporated in a head-mounted display (HMD) device and in which an objective of the optical periscope is disposed above, below, or at a side of the virtual reality display device when the HMD device is worn by the user. In another example, the augmented reality display system further includes an objective mirror that is partially or fully silvered.

A further example includes an augmented reality display system configured to display real world images and virtual world images to a user of the system, comprising: a virtual reality display device configured to render the virtual world images to the user, the virtual reality display device further configured for direct view by the user by being located in front of the user's eye; and an optical periscope configured to provide real world images to the user in which the real world images provide a field of view of the real world in front of the user that is unobstructed by the virtual reality display, the optical periscope including a see-through waveguide disposed between the user's eye and the virtual reality display device and configured to pass virtual world images from the virtual reality display to the user's eye and diffract real world images having the unobstructed field of view to the user's eye.

In another example, the see-through waveguide includes an in-coupling diffractive optical element configured to in-couple real world images into the see-through waveguide. In another example, the see-through waveguide includes an out-coupling diffractive optical element configured to out-couple real world images from the see-through waveguide to the user's eye. In another example, the see-through waveguide is configured as a near-eye display. In another example, the virtual reality display device includes optics located proximate to the user's eye so as to provide a large field of view for the virtual world images. In another example, the virtual reality display device and optical periscope are adjacently located in the augmented reality display system to minimize spatial offset. In another example, the augmented reality display system is incorporated in a head-mounted display device.

A further example includes a head-mounted display (HMD) device configured to provide an augmented reality experience to a user in which virtual world images are combined with images from a real world environment, comprising: a direct-view eyepiece configured to render virtual world images and provide a direct path between the virtual world images and the user's eye, the direct-view eyepiece located in the HMD device in between the user's eye and the real world environment so that portions of the real world environment are blocked by the direct-view eyepiece from the user's view; and an indirect-view optical system configured to capture light from the real world environment and present the captured light to the user's eye, in which the captured light includes light from portions of the real world environment that are blocked by the direct-view eyepiece.

In another example, the indirect-view optical system comprises one of reflective periscope comprising a partially silvered mirror or diffractive periscope comprising a waveguide. In another example, the direct-view eyepiece comprises a virtual reality display device and collimating optics.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An augmented reality display system configured to display real world images and virtual world images to a user of the system, comprising:
   a virtual reality display device configured to render the virtual world images to the user, the virtual reality display device being located in front of the user's eye to provide a direct view by the user over a path between the virtual reality display device and the user's eye; and
   an optical periscope configured to provide real world images to the user in which the real world images provide a field of view of the real world in front of the user that is unobstructed by the virtual reality display, the optical periscope including a combiner plate disposed between the user's eye and the virtual reality display device and configured to pass virtual world images from the virtual reality display to the user's eye and reflect real world images having the unobstructed field of view to the user's eye
   wherein the optical periscope provides a path for the real world images to the user's eye that is separate and distinct from the path for the direct view of the virtual world images.

2. The augmented reality display system of claim 1 in which the virtual reality display device is a non-see-through device.

3. The augmented reality display system of claim 1 in which the combiner plate is a partially-silvered mirror.

4. The augmented reality display system of claim 1 in which the field of view of the real world is selectively switchable from on to off so that only the virtual world images are rendered.

5. The augmented reality display system of claim 1 in which the virtual reality display device includes one of light emitting diode, liquid crystal on silicon device, organic light emitting diode array, or micro-electro mechanical system device.

6. The augmented reality display system of claim 1 in which the virtual reality display device comprises a microdisplay operating in one of transmission, reflection, or emission.

7. The augmented reality display system of claim 1 in which the virtual reality display device includes one or more collimating lenses.

8. The augmented reality display system of claim 1 in which the virtual reality display device comprises a direct-view eyepiece.

9. The augmented reality display system of claim 1 as incorporated in a head-mounted display (HMD) device and in which an objective of the optical periscope is disposed above, below, or at a side of the virtual reality display device when the HMD device is worn by the user.

10. The augmented reality display system of claim 1 further including an objective mirror that is partially or fully silvered.

11. An augmented reality display system configured to display real world images and virtual world images to a user of the system, comprising:
    a virtual reality display device configured to render the virtual world images to the user, the virtual reality display device being located in front of the user's eye to provide a direct view by the user over a path between the virtual reality display device and the user's eye; and
    an optical periscope configured to provide real world images to the user in which the real world images provide a field of view of the real world in front of the user that is unobstructed by the virtual reality display, the optical periscope including a see-through waveguide disposed between the user's eye and the virtual reality display device and configured to pass virtual world images from the virtual reality display to the user's eye and diffract real world images having the unobstructed field of view to the user's eye
    wherein the optical periscope provides a path for the real world images to the user's eye that is separate and distinct from the path for the direct view of the virtual world images.

12. The augmented reality display system of claim 11 in which the see-through waveguide includes an in-coupling diffractive optical element configured to in-couple real world images into the see-through waveguide.

13. The augmented reality display system of claim 11 in which the see-through waveguide includes an out-coupling diffractive optical element configured to out-couple real world images from the see-through waveguide to the user's eye.

14. The augmented reality display system of claim 11 in which the see-through waveguide is configured as a near-eye display.

15. The augmented reality display system of claim 11 in which the virtual reality display device includes optics located proximate to the user's eye so as to provide a large field of view for the virtual world images.

16. The augmented reality display system of claim 11 in which the virtual reality display device and optical periscope are adjacently located in the augmented reality display system to minimize spatial offset.

17. The augmented reality display system of claim 11 as incorporated in a head-mounted display device.

18. A head-mounted display (HMD) device configured to provide an augmented reality experience to a user in which virtual world images are combined with images from a real world environment, comprising:
    a direct-view eyepiece configured to render virtual world images and provide a direct path between the virtual world images and the user's eye, the direct-view eyepiece located in the HMD device in between the user's eye and the real world environment so that portions of the real world environment are blocked by the direct-view eyepiece from the user's view; and
    an indirect-view optical system configured to capture light from the real world environment and present the captured light to the user's eye, in which the captured light includes light from portions of the real world environment that are blocked by the direct-view eyepiece,
    wherein the indirect-view optical system provides a path for the captured light from the real world environment to the user's eye that is separate and distinct from the direct path for the virtual world images.

19. The HMD device of claim 18 in which the indirect-view optical system comprises one of reflective periscope comprising a partially silvered mirror or diffractive periscope comprising a waveguide.

20. The HMD device of claim 18 in which the direct-view eyepiece comprises a virtual reality display device and collimating optics.

\* \* \* \* \*